Figure 1:
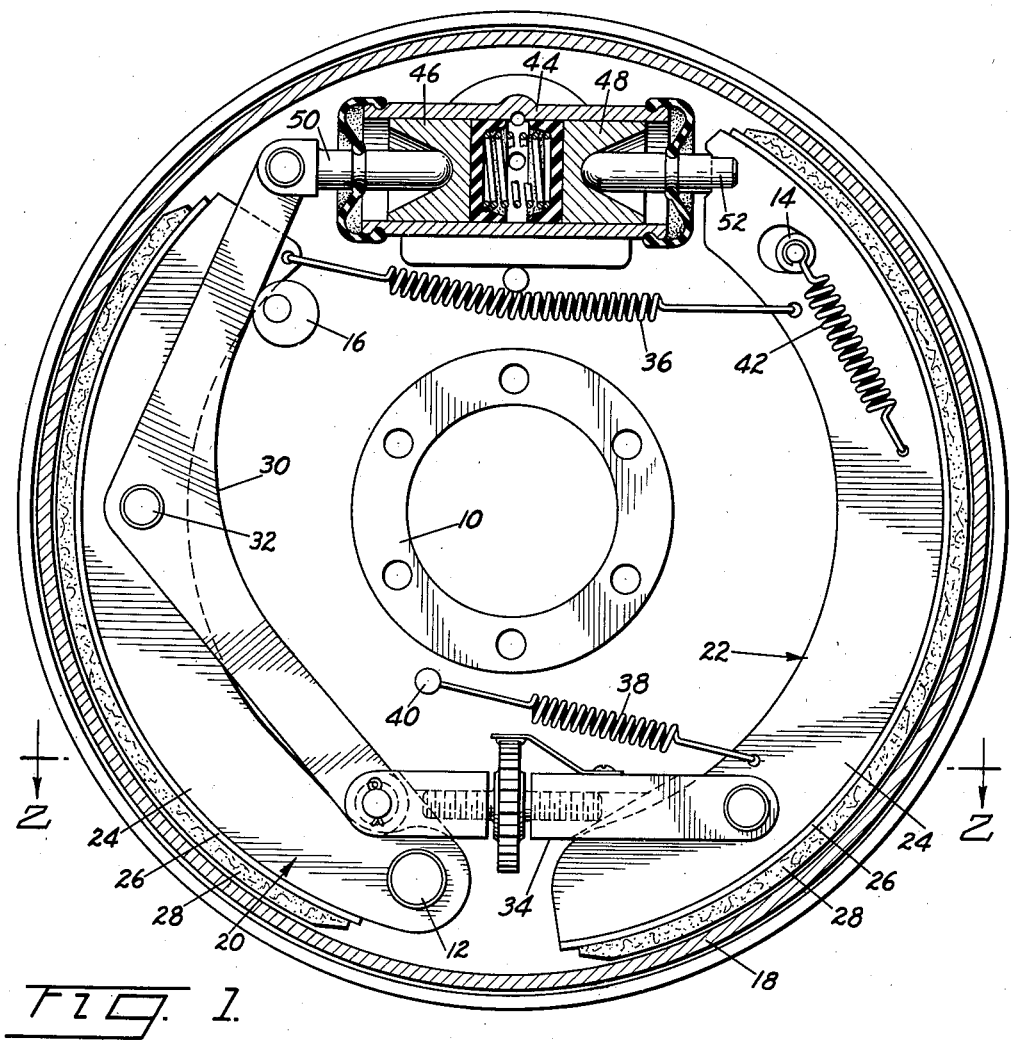

Feb. 18, 1941.   C. V. BERGLUND   2,232,308
BRAKE
Filed May 1, 1939

INVENTOR.
CHARLES V. BERGLUND
BY
C. H. Fowler
ATTORNEY.

Patented Feb. 18, 1941

2,232,308

UNITED STATES PATENT OFFICE 2,232,308

BRAKE

Charles V. Berglund, Detroit, Mich., assignor to Hydraulic Brake Company, Detroit, Mich., a corporation of California Application May 1, 1939, Serial No. 271,183

4 Claims. (Cl. 188—152)

This invention relates to brakes, and more particularly to brakes for motor vehicles.

An object of the invention is to provide a brake wherein maximum efficiency may be attained in both forward and reverse braking.

Another object of the invention is to provide a brake including a movable element, a friction element for cooperation therewith, and means for actuating the friction element with equal force and effectiveness in both forward and reverse braking.

Another object of the invention is to provide a brake including a rotatable drum, a pair of friction elements for cooperation with the drum, and means for actuating the elements with equal force and effectiveness in both forward and reverse braking.

Other objects of the invention will appear from the following description taken in connection with the drawing forming a part of this specification, and in which—

Figure 2:
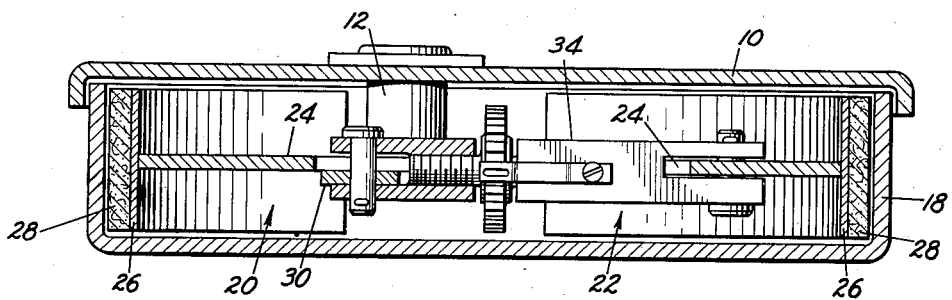

Fig. 1 is a vertical sectional view of a brake illustrating the invention as applied; and Fig. 2 is a sectional view substantially on the line 2—2, Fig. 1.

Referring to the drawing for more specific details of the invention, 10 represents a fixed support or backing plate having arranged thereon anchors 12 and 14 and a retractile stop 16. A rotatable drum 18 is associated with the backing plate, and a pair of friction elements or shoes 20 and 22 suitable for cooperation with the drum are mounted in tandem on the anchors 12 and 14. The shoes may be of any preferred type. Each of the shoes includes a web 24 supporting a rim 26 having secured thereto a lining 28 suitable for frictional engagement with the drum.

The shoe 20 is a forward or a primary braking shoe pivotally mounted on the anchor 12, and the shoe 22 is a reverse or a secondary braking shoe shiftably mounted on the anchor 14. A lever 30 is pivotally mounted on the primary shoe 20, as indicated at 32. One end of this lever is connected by an adjustable link 34 to the secondary shoe 22 adjacent its unanchored end, and the other end of the lever normally rests on the adjustable stop 16.

A retractile spring 36 connects the unanchored end of the primary shoe 20 to the shiftably anchored end of the secondary shoe 22, a retractile spring 38 connects the shiftably anchored secondary shoe 22 adjacent its unanchored end to a fixed support 40 on the backing plate, and a retractile spring 42 connects the secondary shoe 22 to the anchor 14.

A fluid pressure actuated motor 44, mounted on the backing plate 10 between the shoes and adapted to be connected to a suitable source of fluid pressure, includes opposed pistons 46 and 48 connected respectively by thrust pins 50 and 52 to the lever 30 and the shiftably anchored end of the secondary shoe 22.

During a forward braking operation, upon the reception of fluid under pressure in the chamber of the motor 44, the pistons 46 and 48 are actuated and force is transmitted from the pistons through the thrust pins 50 and 52 to the lever 30 and the shiftably anchored end of the secondary shoe 22. This results in actuation of the primary shoe 20 through the lever 30 into engagement with the drum 18 against the resistance of the retractile spring 36 and also actuation of the secondary shoe 22 by the lever 30 into engagement with the drum against the resistance of the spring 38. Because of the load on the spring 42, the secondary shoe 22 does not move from the anchor 14. Hence, the shoes are applied with equal force and effectiveness. Upon release of the applied force the retractile springs 36 and 38 return the shoes to retracted position, and as the shoes are returned to their retracted position the motor 44 is also returned to its retracted position.

During a reverse braking operation, upon introduction of fluid under pressure into the chamber of the motor 44, the pistons 46 and 48 are actuated, and force is transmitted from the pistons through the pins 50 and 52 to the lever 30 and to the shiftably anchored end of the secondary shoe 22. This results in actuation of the shoe 20 against the resistance of the spring 36 into engagement with the drum 18, and also actuation of the secondary shoe 22 against the resistance of the springs 38 and 42 into engagement with the drum. During this operation the secondary shoe 22 leaves the anchor 14, due to the drag of the drum imparting slight rotational movement to the shoe.

Because of the linkage connecting the shoes 20 and 22, the braking effort is taken on the anchor 12. Hence, the shoes are applied with equal effectiveness. Upon conclusion of a reverse braking operation, the shoes and the motor are returned to their retracted positions under the influence of the retractile springs 36, 38 and 42.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a rotatable drum associated therewith, a primary shoe pivotally mounted on a fixed anchor on the support for cooperation with the drum, a secondary shoe having one of its ends shiftably mounted on the support for cooperation with the drum, a lever fulcrumed on the primary shoe, an adjustable link connecting one end of the lever to the unanchored end of the shiftably anchored shoe, and a fluid pressure actuated motor connected to the other end of the lever and to the anchored end of the secondary shoe.

2. A brake comprising a fixed support, a rotatable drum associated therewith, a pair of shoes for cooperation with the drum including a primary shoe having its articulate end mounted on a fixed anchor on the support, and a secondary shoe having its articulate end shiftably mounted on another fixed anchor mounted on the support, linkage including a lever connecting the primary shoe to the secondary shoe, and means effective for actuating the lever only in one direction of braking and for actuating the lever and the secondary shoe in another direction of braking.

3. A brake comprising a fixed support, a rotatable drum associated therewith, a pair of shoes anchored in tandem on the support for cooperation with the drum including a primary shoe having its articulate end pivoted on a fixed anchor, and a secondary shoe shiftably mounted on another fixed anchor, linkage including a lever connecting the primary shoe to the secondary shoe, and a fluid pressure actuated motor operative to actuate the lever in one direction of braking only and to actuate the lever and the secondary shoe in another direction of braking.

4. A brake comprising a fixed support, a rotatable drum associated therewith, a pair of shoes mounted on the support for cooperation with the drum including a primary shoe pivotally mounted on a fixed anchor on the support and a secondary shoe shiftably mounted on another fixed anchor on the support, a lever fulcrumed on the primary shoe, an adjustable link connecting the lever to the unanchored end of the secondary shoe, and a fluid pressure actuated motor connected to the lever and the shiftably anchored end of the secondary shoe, said motor operative to actuate the lever only on a forward braking application and to actuate the lever and the secondary shoe on a reverse braking application.

CHARLES V. BERGLUND.